United States Patent
Campbell et al.

(10) Patent No.: US 10,639,543 B2
(45) Date of Patent: May 5, 2020

(54) HANDHELD CONTROLLERS WITH TOUCH-SENSITIVE CONTROLS

(71) Applicant: Valve Corporation, Bellevue, WA (US)

(72) Inventors: Ian Campbell, Bellevue, WA (US); Jeffrey Peter Bellinghausen, Bellevue, WA (US); Brian David Hensley, Bellevue, WA (US); Scott Dalton, Seattle, WA (US); Michael Jacob Goerz, Snohomish, WA (US); Cheang Tad Yoo, Bothell, WA (US)

(73) Assignee: Valve Corporation, Bellevue, WA (US)

( * ) Notice: Subject to any disclaimer, the term of this patent is extended or adjusted under 35 U.S.C. 154(b) by 12 days.

(21) Appl. No.: 15/934,725

(22) Filed: Mar. 23, 2018

(65) Prior Publication Data
US 2019/0291000 A1    Sep. 26, 2019

(51) Int. Cl.
| | | |
|---|---|---|
| A63F 13/218 | (2014.01) | |
| A63F 13/24 | (2014.01) | |
| A63F 13/214 | (2014.01) | |
| A63F 13/21 | (2014.01) | |
| A63F 13/245 | (2014.01) | |
| A63F 13/20 | (2014.01) | |

(52) U.S. Cl.
CPC ............ *A63F 13/218* (2014.09); *A63F 13/20* (2014.09); *A63F 13/21* (2014.09); *A63F 13/214* (2014.09); *A63F 13/24* (2014.09); *A63F 13/245* (2014.09)

(58) Field of Classification Search
CPC ........ A63F 13/20; A63F 13/21; A63F 13/214; A63F 13/218; A63F 13/24; A63F 13/245
See application file for complete search history.

(56) References Cited

U.S. PATENT DOCUMENTS

| | | | | |
|---|---|---|---|---|
| 8,641,525 | B2 * | 2/2014 | Burgess | A63F 13/24 |
| | | | | 463/37 |
| 9,289,688 | B2 * | 3/2016 | Burgess | A63F 13/20 |
| 9,352,229 | B2 * | 5/2016 | Burgess | A63F 13/02 |
| 10,065,111 | B1 * | 9/2018 | Patel | A63F 13/24 |
| 10,286,308 | B2 * | 5/2019 | Sawyer | G02B 27/017 |
| 10,307,669 | B2 * | 6/2019 | Hope | A63F 13/24 |
| 10,328,344 | B2 * | 6/2019 | Bellinghausen | A63F 13/285 |
| 10,391,400 | B1 * | 8/2019 | Mucha | G06F 3/0346 |
| 10,534,447 | B2 * | 1/2020 | Li | G06F 3/0346 |
| 2010/0245239 | A1 * | 9/2010 | Sternberg | A63F 13/06 |
| | | | | 345/156 |
| 2015/0105152 | A1 * | 4/2015 | Bellinghausen | A63F 13/285 |
| | | | | 463/31 |

(Continued)

OTHER PUBLICATIONS

The PCT Search Report and Written Opinion dated Jun. 6, 2019 for PCT Application No. PCT/US19/21895, 8 pages.

*Primary Examiner* — William H McCulloch, Jr.
(74) *Attorney, Agent, or Firm* — Lee & Hayes, P.C.

(57) ABSTRACT

Described herein are, among other things, handheld controllers having touch-sensitive controls, as well as methods for use of the touch-sensitive controls and methods for assembling the handheld controllers. An example handheld controller may include a top-surface control (e.g., a "trigger button") that includes a switch, a pressure sensor, and a touch sensor for detecting a presence, location, and/or gesture of a finger on the top-surface control.

27 Claims, 7 Drawing Sheets

(56) References Cited

U.S. PATENT DOCUMENTS

| | | | |
|---|---|---|---|
| 2016/0062489 A1* | 3/2016 | Li | G06F 3/017 |
| | | | 345/163 |
| 2017/0123516 A1* | 5/2017 | Li | G06F 3/0346 |
| 2017/0192506 A1 | 7/2017 | Andersen et al. | |
| 2018/0099219 A1* | 4/2018 | Hope | A63F 13/24 |
| 2018/0104576 A1* | 4/2018 | Hope | A63F 13/24 |
| 2018/0264357 A1* | 9/2018 | Dalton | A63F 13/24 |
| 2018/0272232 A1* | 9/2018 | Campbell | A63F 13/218 |
| 2018/0361234 A1* | 12/2018 | Nietfeld | A63F 13/245 |
| 2019/0118079 A1* | 4/2019 | Bellinghausen | A63F 13/24 |
| 2019/0118080 A1* | 4/2019 | Campbell | A63F 13/24 |
| 2019/0138107 A1* | 5/2019 | Nietfeld | G06F 3/017 |
| 2019/0299094 A1* | 10/2019 | Bellinghausen | A63F 13/214 |

\* cited by examiner

HANDHELD CONTROLLERS WITH TOUCH-SENSITIVE CONTROLS

BACKGROUND

Handheld controllers are used in an array of architectures for providing input, for example, to a remote computing device. For instance, handheld controllers are utilized in the gaming industry to allow players to interact with a personal computing device executing a gaming application, a game console, a game server, or the like. While current handheld controllers provide a range of functionality, further technical improvements may enhance user experiences that these controllers offer.

BRIEF DESCRIPTION OF THE DRAWINGS

The detailed description is described with reference to the accompanying drawings. In the figures, the left-most digit(s) of a reference number identifies the figure in which the reference number first appears. The use of the same reference numbers in different figures indicates similar or identical components or features.

DETAILED DESCRIPTION

Figure 1:
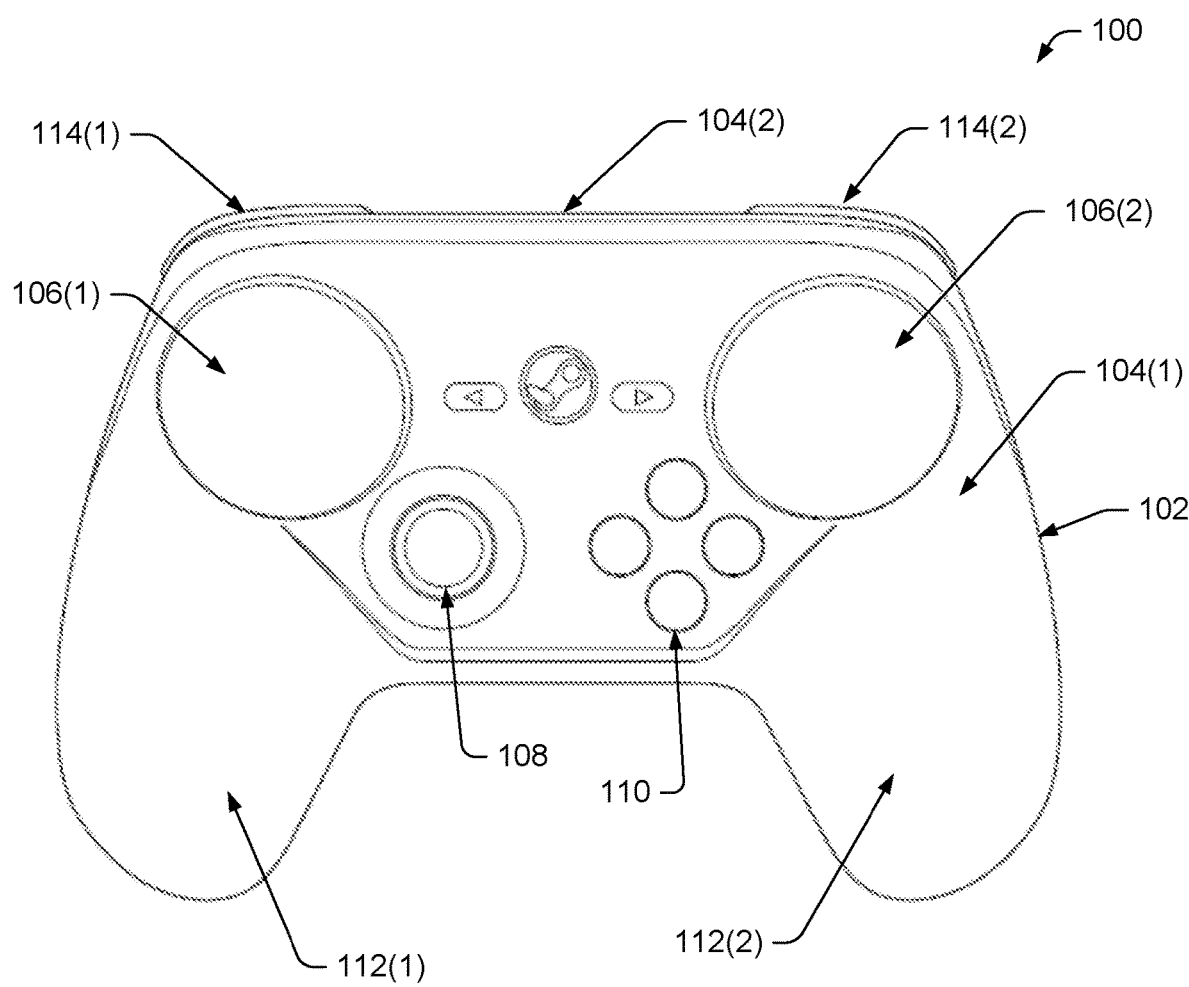
FIG. 1 is a front view of an example handheld controller that includes, in part, a top-surface control having a touch sensor for detecting a presence, location, and/or gesture of a finger of a user operating the handheld controller.

Described herein are, among other things, handheld controllers having touch-sensitive controls, as well as methods for use of the touch-sensitive controls and methods for assembling the handheld controllers. In some instances, a handheld controller as described herein may be used to control a remote device (e.g., a television, audio system, personal computing device, game console, etc.), to engage in video game play, and/or the like. The handheld controller may include one or more controls, including one or more front-surface controls on a front surface of a housing of the handheld controller. These front-surface controls may include one or more joysticks, trackpads, trackballs, buttons, or other controls that are controllable by a thumb of a user of the handheld controller. Additionally, or alternatively, the handheld controller may include one or more top-surface controls residing on a top surface of a housing of the handheld controller. For example, these top-surface controls may be referred to as "triggers", "bumpers", or the like and may be controllable by one or more fingers of the user, such as a middle finger, an index finger, or the like. In some instances, the handheld controller includes one or more left top-surface controls that are operable by one or more fingers of a left hand of the user and one or more right top-surface controls that are operable by one or more fingers of a right hand of the user.

As described in detail below, these top-surface control(s) may include a touch sensor that is configured to detect a presence, location, and/or gesture of a finger of the user on the respective control. For example, a top-surface control of the handheld controller may include a switch that is selectable by the finger of the user, as well as a touch sensor to detect the finger on the control. The touch sensor may comprise a capacitive touch sensor, a resistive touch sensor, an infrared touch sensor, a touch sensor that utilizes acoustic soundwaves to detect a presence or location of an object, or any other type of touch sensor. In some instances, the touch sensor comprises an array of capacitive pads that covers some or substantially all of a surface area of the corresponding top-surface control.

In some instances, the touch sensor couples to one or more processors of the handheld controller to send touch data indicative of a touch input. The touch data may indicate a location of the touch input, potentially as it changes over time. The handheld controller may include logic (e.g., software, hardware, firmware, etc.) that is configured to receive the touch data and determine the presence of a finger of the user and/or a location (or "position") of the finger. For example, the touch sensor may be associated with different regions, such that the logic is configured to determine which region the finger is located in based in part on the touch input. This information may be provided to a game or other application for performing one or more actions corresponding to the location of the finger on the top-surface control. For instance, the touch sensor may be associated with two or more regions, selection of which is associated with different respective actions. The logic may further analyze the touch data to identify a gesture of the finger on the control, such as the user moving the finger a certain direction, at a certain speed, and/or the like. Again, the logic may provide an indication of this gesture to an application that is configured to perform a predefined action associated with the gesture. In the example of the gaming environment, the game application may switch weapons of a user, cause an avatar to strafe or otherwise move a predefined direction, or perform any other predefined action.

In addition to the touch sensor, the top-surface control may include a switch that is selectable via a press of a button atop the switch, as well as a pressure sensor configured to detect or measure an amount of force associated with the selection. In some instances, the top-surface control includes a top cover that is adjacent to the touch sensor and that at least partly covers the switch and the pressure sensor. Therefore, when a finger of a user presses the top cover, the top cover presses down on the switch as well as the pressure sensor. The switch and the pressure sensor may each couple to the one or more processors of the handheld controller such that selection of the top cover may result in selection data, indicative of a selection of the control, being provided from the switch to the processors. In addition, the pressure sensor may provide force data, indicative of an amount of force of the selection, to the processors. Along with the touch data, the selection data and/or force data may be provided to a game or other application for interpreting the data as one or more commands. In some instances, the touch data, the selection data, and/or the force data may be interpreted together and associated with a predefined command. The pressure sensor of the handheld controller may comprise a force-sensing resistor (FSR) sensor, a piezoelectric sensor, a load cell, a strain gauge, a capacitive-type pressure sensor that measures capacitive force measurements, or any other type of pressure sensor.

While traditional handheld controllers include controls that are selectable, combining a control that has a switch, to identify selection of the control, with touch-sensing functionality may increase the amount and richness of gestures that may be interpreted on the handheld controller. Further, these gestures may enrich the operation of the game or other applications being controlled by the handheld controller.

FIG. 1 is a front view of an example handheld controller 100 that may include one or more touch-sensitive, top-surface controls. Touch data generated by these touch-sensitive controls may be used to detect a presence, location, and/or gesture of a finger of a user operating the handheld controller.

As illustrated, the handheld controller 100 includes a housing 102 having a front surface 104(1) and a top surface 104(2) potentially along with a back surface opposite the front surface 104(1) and a bottom surface opposite the top surface 104(2). The front surface 104(1) may include one or more front-surface controls that are, in some instances, controllable by one or thumbs of a user operating the handheld controller 100. These front-surface controls may include one or more trackpads, trackballs, joysticks, buttons, or the like. In this example, the front surface 104(1) includes a left trackpad 106(1) controllable by a left thumb of a user and a right trackpad 106(2) controllable by a right thumb of the user. In addition, the example controller 100 includes a joystick 108 (e.g., controllable by the left thumb of the user) and depressible buttons 110 (e.g., controllable by a right thumb of the user). In this example, the handheld controller 100 also includes a left grip 112(1) and a right grip 112(2) by which a user may hold the controller 100 via right and left hands of the user, respectively.

The top surface 104(2), meanwhile, may include one or more top-surface controls. In the illustrated example, the controller 100 includes a left top-surface control 114(1) and a right top-surface control 114(2). The left top-surface control 114(1) may be operable by a left finger (e.g., middle finger or index finger) of the user, while the right top-surface control may be operable by a right finger (e.g., middle finger or index finger) of the user. The top-surface controls 114(1) and 114(2) may be referred to as "triggers" or "bumpers" in some instances. Furthermore, one or more of the top-surface controls 114(1) and 114(2) may include one or more touch sensors for detecting a presence, location, and/or gesture of one or more fingers of the user on the respective top-surface control.

Figure 2:
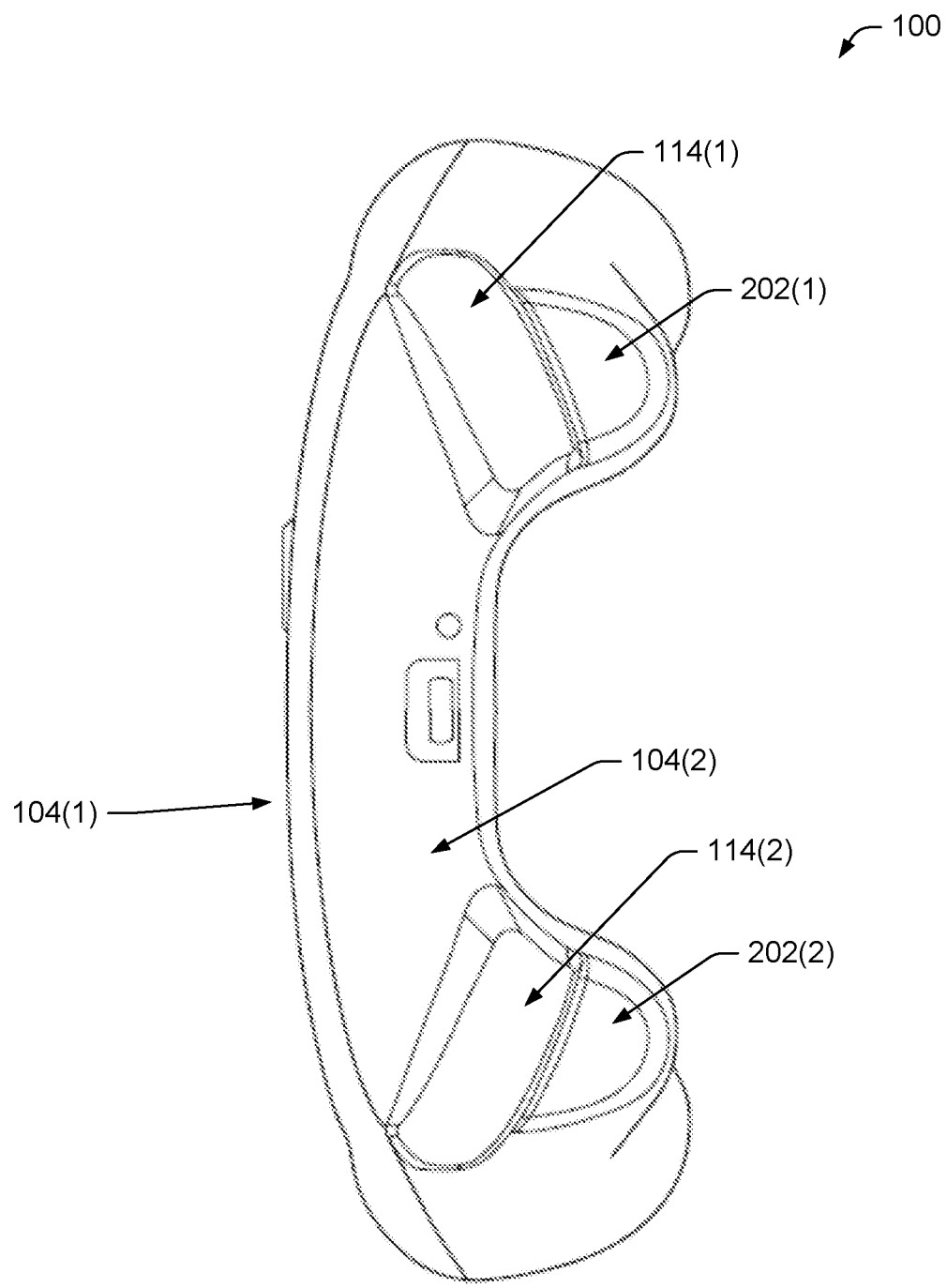
FIG. 2 is a top view of the example handheld controller of FIG. 1.

FIG. 2 is a top view of the example handheld controller 100. As illustrated, the top surface 104(2) may include an additional left top-surface control 202(1) operable by a left finger of the user and an additional right top-surface control 202(2) operable by a right finger of the user. In some instances, both the additional left top-surface control 202(1) and the additional right top-surface control 202(2) may include a touch sensor for detecting the presence, position, and/or gesture of a finger on the control in addition to, or instead of, the touch sensors residing on the top-surface controls 114(1) and/or 114(2).

Figure 3:
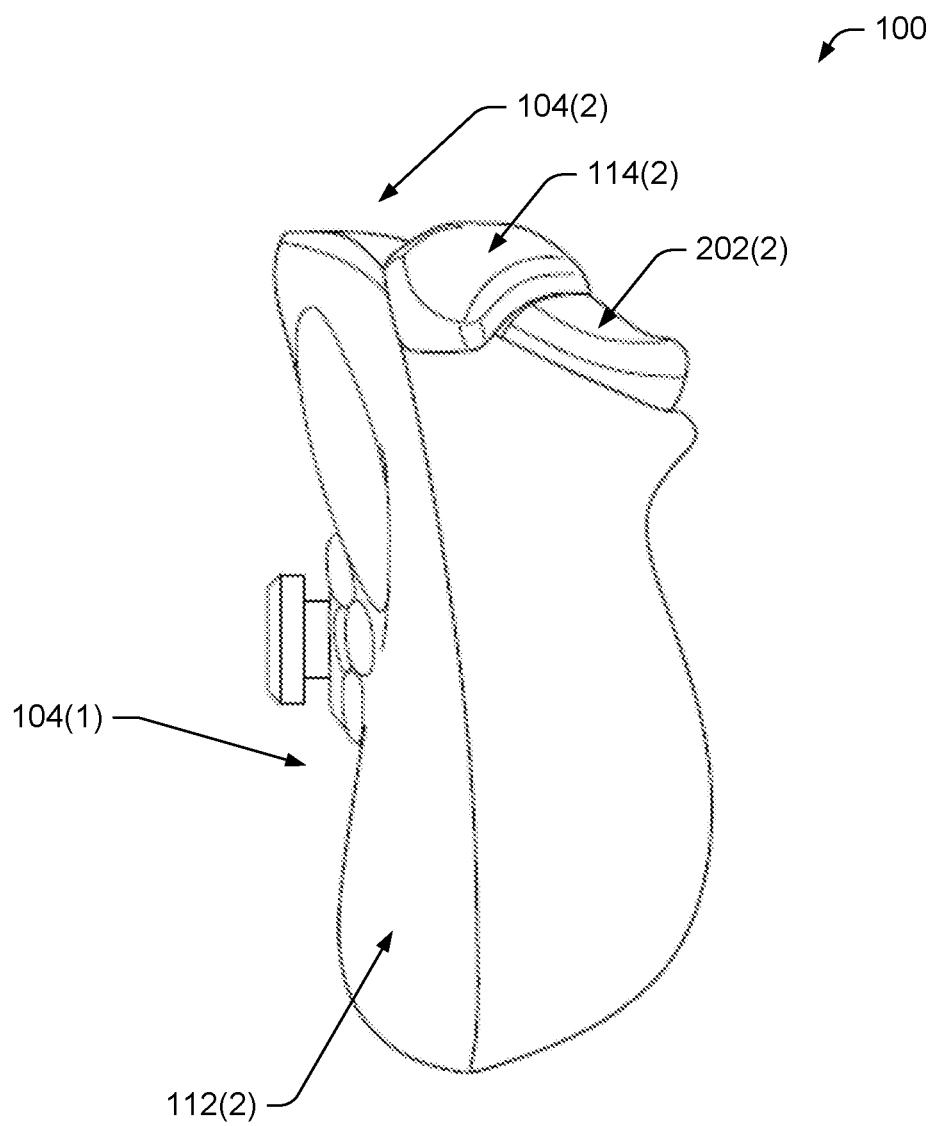
FIG. 3 is a side view of the example handheld controller of FIG. 1.

FIG. 3 is a side view of the example handheld controller 100. As illustrated, the side view illustrates the right grip 112(2) and the right top-surface controls 114(2) and 202(2). One or more of the controls 114(2) and 202(2) may be touch-sensitive to identify the presence, position, and/or gestures of one or more fingers on the control(s).

Figure 4:
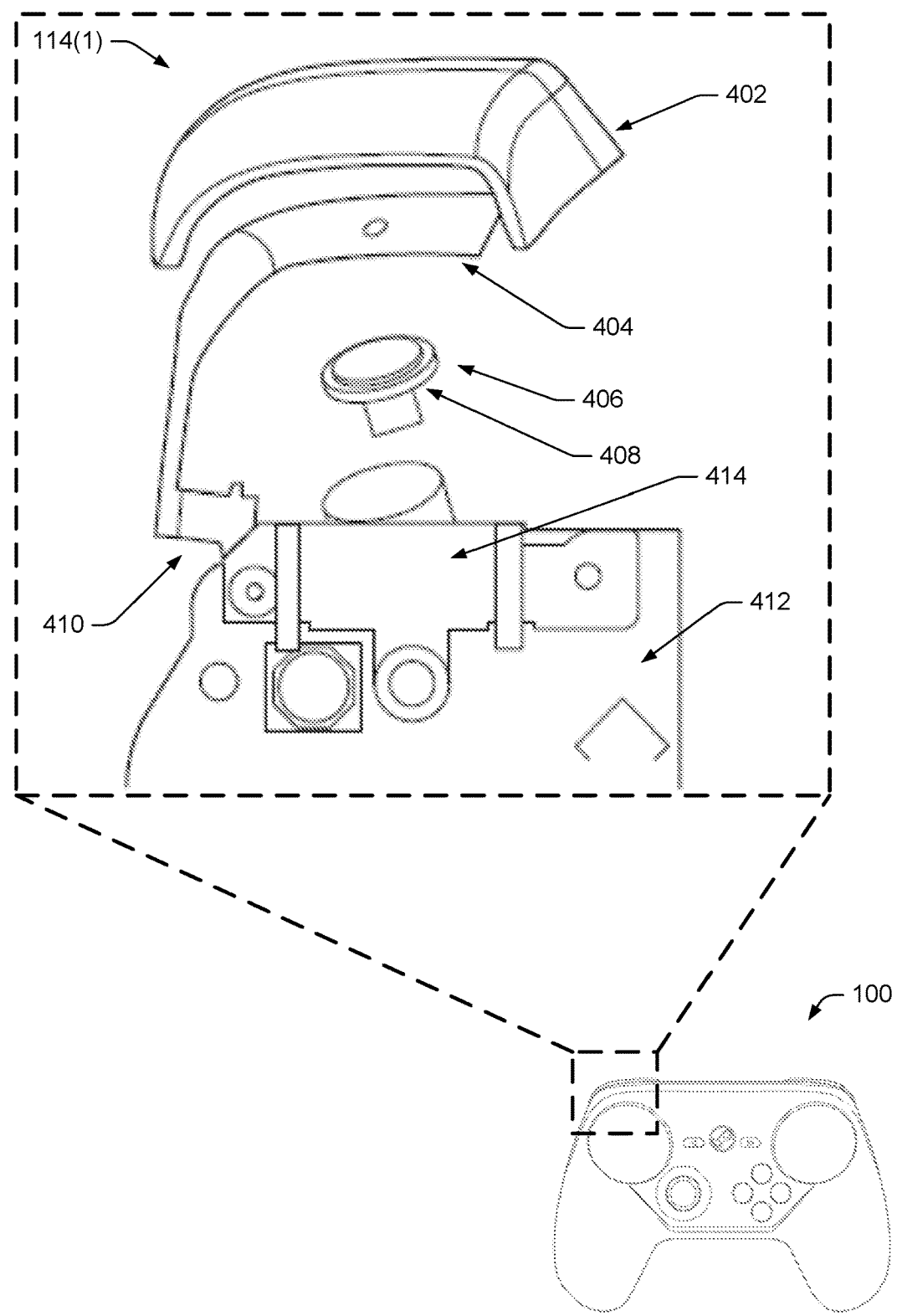
FIG. 4 is an exploded view of a portion of the handheld controller of FIG. 1. In this example, a top-surface control of the handheld controller includes a touch sensor underneath a top cover of the control, as well as a switch for detecting a press of the control and a pressure sensor for determining an amount of force associated with the press.

FIG. 4 is an exploded view of a portion of the handheld controller 100. In this example, the left top-surface control 114(1) includes a top cover 402, a touch sensor 404 underneath the top cover 402, a switch 406 for detecting a press of the control 114(1) via the top cover, and a pressure sensor 408 for determining an amount of force associated with the press. The top cover 402 may comprise a single piece of injection-molded plastic or any other material that is rigid enough to transfer a force from a finger of the user to the switch 406 and thin enough to allow for capacitive coupling between a finger of the user and the touch sensor 404. While not illustrated, the top cover 102 may include a button-pusher component on a bottom surface that protrudes downwards to press down on the switch 406 and/or pressure sensor in response to selection of the top cover 402 by a finger.

In this example, the touch sensor 404 comprises a capacitive array that is adhered or otherwise attached to a back surface of the top cover 402. As illustrated, the touch sensor 404 may include a connector 410 for connecting to a printed circuit board (PCB) 412 of the handheld controller 100 that includes one or more processors. In other instances, the touch sensor may attach to a top surface of the top cover or may comprise a different type of touch sensor, such as an infrared or acoustic touch sensor.

In instances where the touch sensor 404 comprises a capacitive array, the touch sensor 404 may generate touch data for use in detecting a presence, location, and/or gesture of the finger of the user. In these instances, a voltage is applied to a conductive layer to result in a substantially uniform electrostatic field. When a conductor, such as a finger of a user, touches or nears the touch sensor 404, a change in capacitance occurs. The capacitance values are measured across the capacitive array to determine the location of the conductor, such as the finger. In some instances, these capacitive values may be measured over time for use in identifying a gesture of the finger of the user, such as a swipe or the like. In addition, or in the alternative, the touch sensor may comprise multiple regions such that a location of a touch may be determined to be in one or more particular regions of the touch sensor 404. Of course, while the above describes an example capacitive touch sensor, it is to be appreciated that the techniques may implement any type of alternative touch sensor.

The switch 406 may comprise a digital switch mounted on the pressor sensor 408, such as an FSR pressure sensor. This combination may also attach to the PCB 412, via a frame 414, to allow the switch 406 and/or the pressure sensor 408 to provide selection data indicative of a selection of the top-surface control 114(1) and/or force data indicative of a force associated with the selection. In some instances, the switch may act as an analog input, in that a selection is detected if the user presses down on the switch via the top cover 402 with a force that is greater than a threshold. If not, then no selection is detected. In other instances, the handheld controller 100 may be associated with different force thresholds to create a multi-tiered digital trigger, in that different types of selection may be determined based on the force associated with the press of the control 114(1). For example, if the finger presses down on the control 114(1) with a first amount of force that is greater than a first force threshold, then a first type of selection may be detected. The first type of selection may be associated with a first predefined action determined, for example, by a game or other application that the handheld controller 100 is interacting with. If, however, the finger presses down with a second amount of force that is greater than both the first force threshold and a second, greater force threshold, then a second type of selection may be detected, and so forth. The second type of selection, and subsequent types of selections, may be associated with a second predefined action and so forth. In addition, these predefined actions may be associated with analog input from controllers such as joysticks, triggers, etc.

In some instances, the touch data generated by the touch sensor 404 may also be used, in addition to the selection data generated by the switch 406 and/or the force data generated by the pressure sensor 408, to detect a particular gesture. In each instance, one or more gestures may be detected by one or more processors of the handheld controller 100, while other gesture(s) may be detected by one or more processors of a remote system (e.g., a host computing device, a game console, etc.) that the handheld controller 100 is interacting with.

Figure 5:
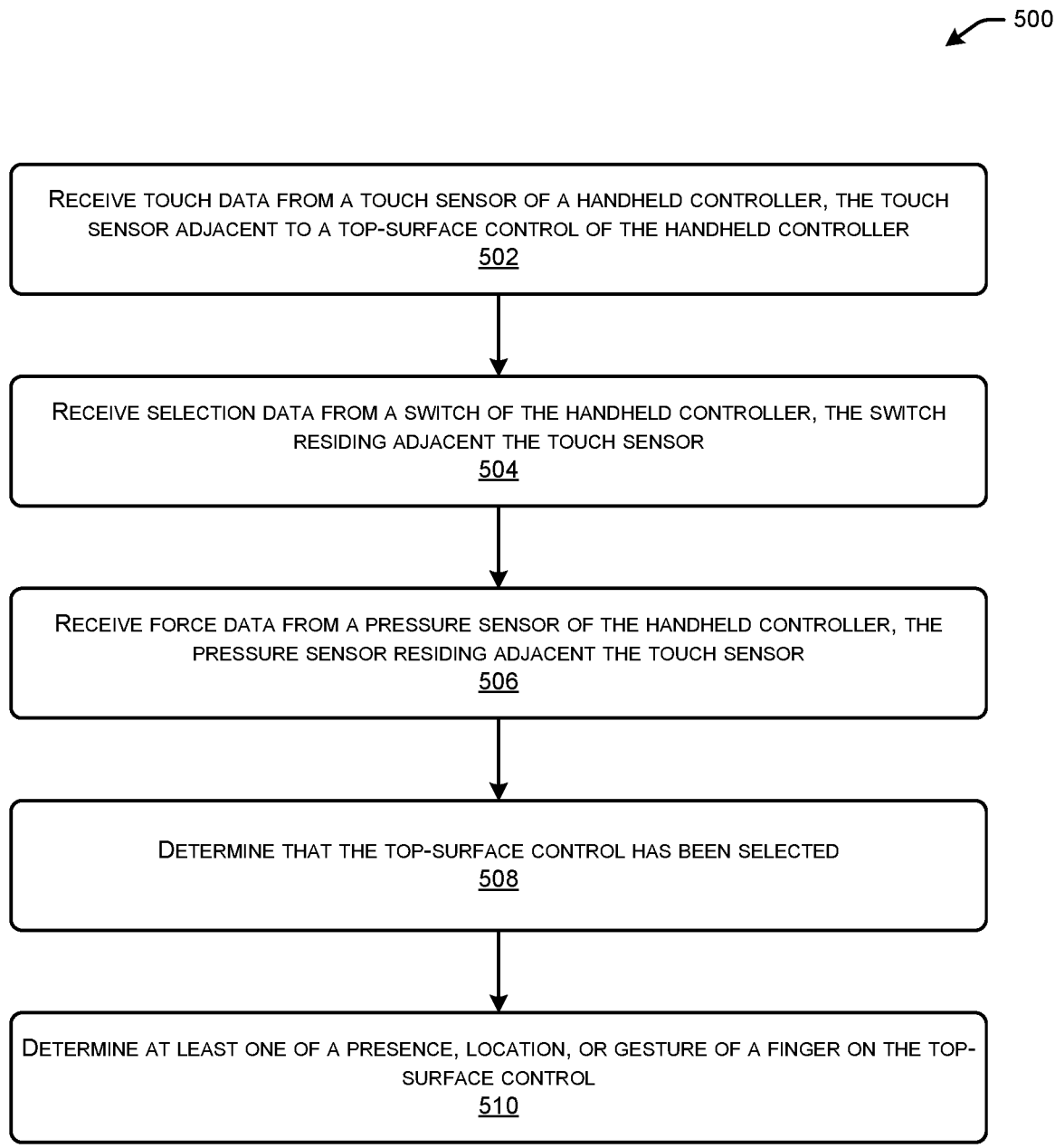
FIG. 5 is a flow diagram of an example process for detecting a presence, location, and/or gesture of a finger of a user on a top-surface control of a handheld controller.

FIG. 5 is a flow diagram of an example process 500 for detecting a presence, location, and/or gesture of a finger of a user on a top-surface control of a handheld controller, such as one or more of the controls 114(1), 114(2), 202(1), and/or 202(2). The process 500 is described as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes.

At an operation 502, touch data from a touch sensor of a handheld controller is received, with the touch sensor residing adjacent to a top-surface control of the handheld controller, the top-surface control being operable by at least one finger of a user of the handheld controller. For instance, one or more processors of the handheld controller may receive this touch, while in other instances one or more processors of a remote system (e.g., a host computing device, a game console, etc.) may receive this touch data. At an operation 504, selection data may be received from a switch of the handheld controller based at least in part upon a press of the top-surface control by at least one finger, with the switch residing adjacent the touch sensor. Again, processor(s) of the handheld controller and/or processor(s) of a remote system may receive this selection data. At an operation 506, force data may be received from a pressure sensor of the handheld controller based at least in part upon a press of the top-surface control by the at least one finger, with the pressure sensor residing adjacent the touch sensor. The processor(s) of the handheld controller and/or the processor(s) of a remote system may receive this force data.

At an operation 508, processor(s) of the handheld controller and/or processor(s) of a remote system may determine that the top-surface control has been selected, based at least in part on one or more of the selection data, the force data, and/or the touch data. For instance, the selection data may indicate that the switch has been depressed, the force data may indicate that the pressure sensor has detected a force that is greater than a force threshold, or the like. At an operation 510, processor(s) of the handheld controller and/or processor(s) of a remote system may determine at least one of a presence, a location, or a gesture of the finger on the top-surface control based at least in part on the touch data, the selection data, and/or the force data.

Figure 6:
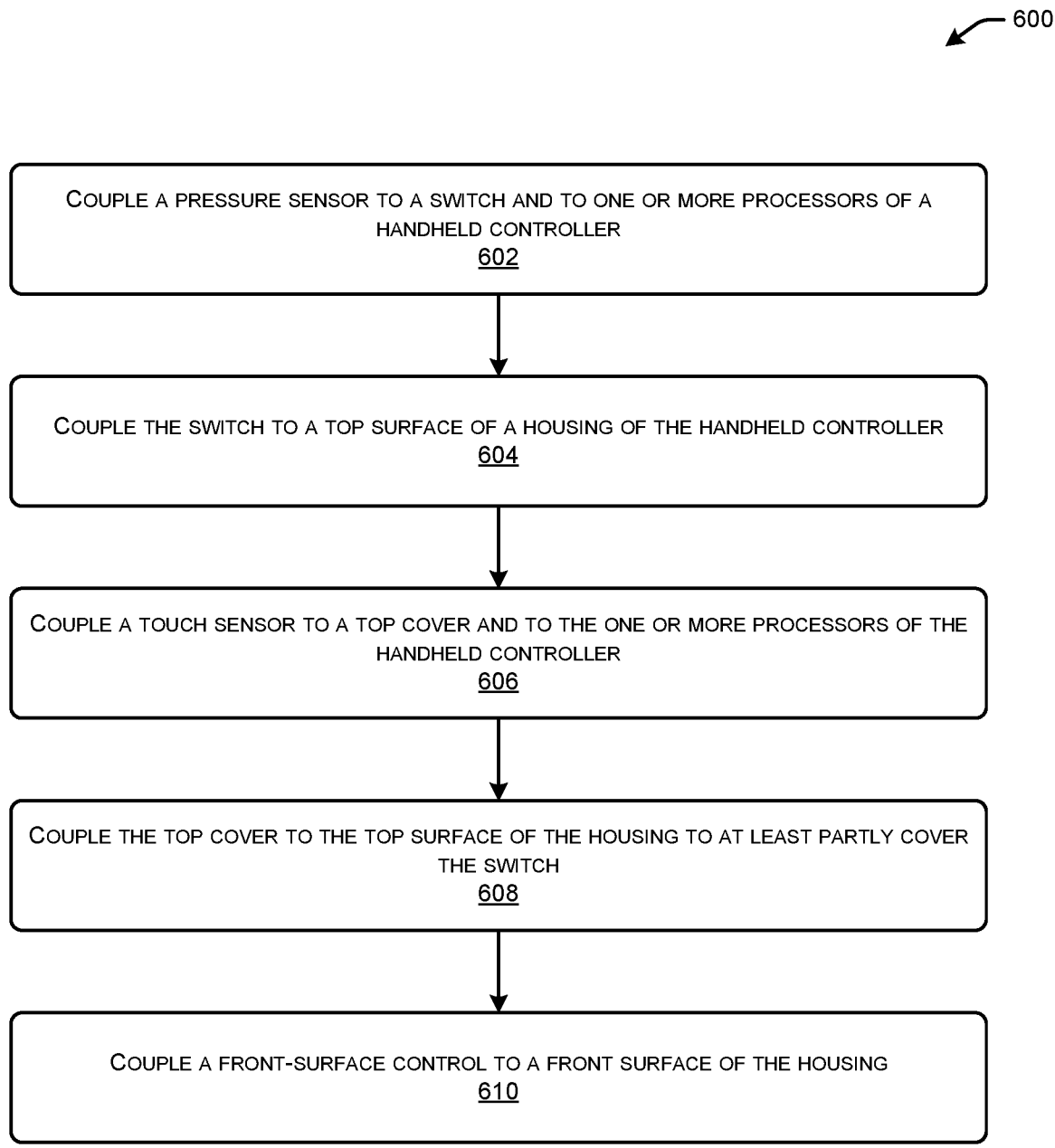
FIG. 6 is a flow diagram of an example process for assembling at least a portion of a handheld controller that includes a touch-sensitive, top-surface control.

FIG. 6 is a flow diagram of an example process 600 for assembling at least a portion of a handheld controller that includes a touch-sensitive, top-surface control. An operation 602 represents coupling a pressure sensor to a switch and, sometime before after, to the one or more processors of a handheld controller. The switch may be configured to generate selection input at least partly in response to a press of the switch, while the pressure sensor may be configured to generate force data indicative of a force of the press of the switch. An operation 604, meanwhile, represents coupling the switch to a top surface of a housing of the handheld controller. An operation 606 represents coupling a touch sensor to a top cover and, sometime before or after, to the one or more processors of the handheld controller. As described above, the touch sensor may comprise a capacitive touch sensor or any type of touch sensor configured to generate touch data and provide the touch data to the one or more processors.

An operation 608 represents coupling the top cover to the top surface of the housing to at least partly cover the switch such that selection of the top cover by a finger of a user of the handheld controller causes the press of the switch. Finally, an operation 610 represents coupling a front-surface control to a front surface of the housing, the front-surface control operable by a thumb of the user. For instance, this operation may comprise attaching a trackpad, joystick, trackball, or other type of control on the front surface of the housing.

It is to be appreciated that while the process 600 describes example operations, other implementations may include additional and/or alternative operations. Further, the order in which these operations are described is not limiting and the components may be arranged and/or assembled in any other similar or different manner. In addition, while the process 600 describes several components that may be assembled to form at least a portion of a handheld controller, it is to be appreciated that the handheld controller may include additional and/or alternative components.

Figure 7:
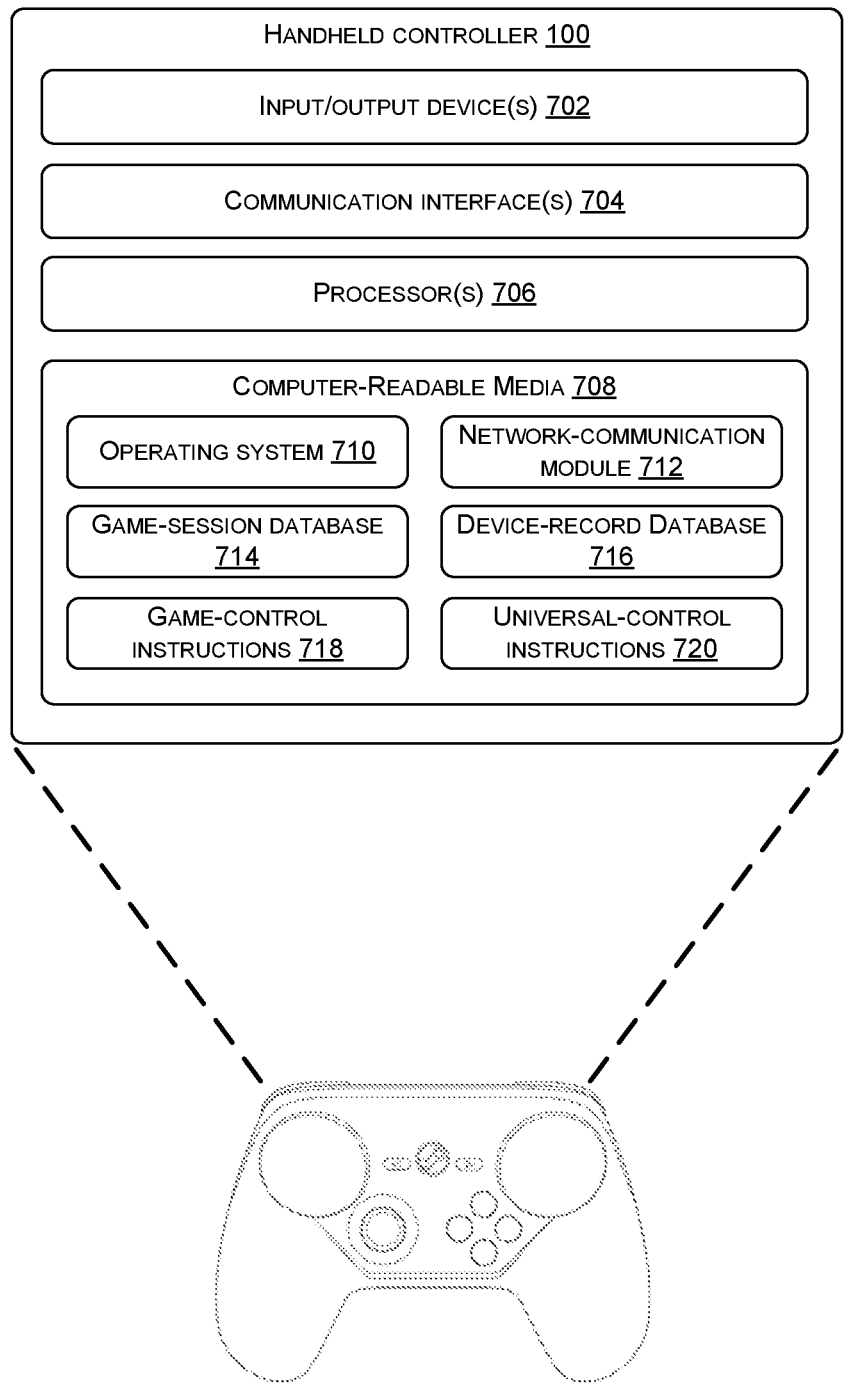
FIG. 7 illustrates example components of a handheld controller, such as the controller of FIG. 1.

FIG. 7 illustrates example components of a handheld controller, such as the controller 100. As illustrated, the handheld controller includes one or more input/output (I/O) devices 702, such as the controls described above (e.g., joysticks, trackpads, triggers, etc.), potentially any other type of input or output devices. For example, the I/O devices 702 may include one or more microphones to receive audio input, such as user voice input. In some implementations, one or more cameras or other types of sensors (e.g., inertial measurement unit (IMU)) may function as input devices to receive gestural input, such as motion of the handheld controller 100. In some embodiments, additional input devices may be provided in the form of a keyboard, keypad, mouse, touch screen, joystick, control buttons and the like. The input device(s) may further include control mechanisms, such as basic volume control button(s) for increasing/decreasing volume, as well as power and reset buttons.

The output devices, meanwhile, may include a display, a light element (e.g., LED), a vibrator to create haptic sensations, a speaker(s) (e.g., headphones), and/or the like. There may also be a simple light element (e.g., LED) to indicate a state such as, for example, when power is on. While a few examples have been provided, the handheld controller may additionally or alternatively comprise any other type of output device.

In some instances, output by the one or more output devices may be based on input received by one or more of the input devices. For example, selection of a top-surface control may result in the output of a haptic response by a vibrator located adjacent (e.g., underneath) the top-surface control or at any other location. In some instances, the output may vary based at least in part on a characteristic of a touch input on a touch sensor, such as the touch sensor associated with the top-surface control. For example, a touch input at a first location on the touch sensor may result in a first haptic output, while a touch input at a second location on the touch sensor may result in a second haptic output. Furthermore, a particular gesture on the touch sensor may result in a particular haptic output (or other type of output). For instance, a swipe gesture on the top-surface control may result in a first type of haptic output, while a tap on the top-surface control (detected by the touch sensor) may result in a second type of haptic output, while a hard press of the top-surface control may result in a third type of haptic output.

In addition, the handheld controller 100 may include one or more communication interfaces 704 to facilitate a wireless connection to a network and/or to one or more remote systems (e.g., a host computing device executing an application, a game console, etc.). The communication interfaces 704 may implement one or more of various wireless technologies, such as Wi-Fi, Bluetooth, radio frequency (RF), and so on. It is to be appreciated that the handheld controller 100 may further include physical ports to facilitate a wired connection to a network, a connected peripheral device, or a plug-in network device that communicates with other wireless networks.

In the illustrated implementation, the handheld controller further includes one or more processors 706 and computer-readable media 708. In some implementations, the processors(s) 706 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, each of the processor(s) 706 may possess its own local memory, which also may store program modules, program data, and/or one or more operating systems.

The computer-readable media 708 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The computer-readable media 708 may be implemented as computer-readable storage media ("CRSM"), which may be any available physical media accessible by the processor(s) 706 to execute instructions stored on the computer-readable media 708. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other tangible medium which can be used to store the desired information and which can be accessed by the processor(s) 706.

Several modules such as instruction, datastores, and so forth may be stored within the computer-readable media 708 and configured to execute on the processor(s) 706. A few example functional modules are shown as stored in the computer-readable media 708 and executed on the processor(s) 706, although the same functionality may alternatively be implemented in hardware, firmware, or as a system on a chip (SOC).

An operating system module 710 may be configured to manage hardware within and coupled to the handheld controller 100 for the benefit of other modules. In addition, the computer-readable media 708 may store a network-communications module 712 that enables the handheld controller 100 to communicate, via the communication interfaces 704, with one or more other devices, such as a personal computing device executing an application (e.g., a game application), a game console, a remote server, or the like. The computer-readable media 708 may further include a game-session database 714 to store data associated with a game (or other application) executing on the handheld controller or on a computing device to which the handheld controller 100 couples. The computer-readable media 708 may also include a device-record database 716 that stores data associated with devices to which the handheld controller 100 couples, such as the personal computing device, game console, remote server or the like. The computer-readable media 708 may further store game-control instructions 718 that configure the handheld controller 100 to function as a gaming controller, and universal-control instructions 720 that configure the handheld controller 100 to function as a controller of other, non-gaming devices.

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors; and
   a handheld controller comprising:
   a housing having a front surface and a top surface;
   a front-surface control residing on the front surface of the housing and controllable by a thumb of a user of the handheld controller; and
   a top-surface control residing on the top surface of the housing and controllable by at least one of a middle finger or index finger of the user, the top-surface control comprising:
   a top cover;
   a touch sensor adjacent to the top cover and configured to provide, to the one or more processors, touch data indicative of a touch input based at least in part on contact between the at least one of the middle finger or the index finger and the top cover;
   a digital switch residing at least partly beneath the top cover, mounted on a pressure sensor, and configured to provide, to the one or more processors, selection data indicative of a selection of the top-surface control based at least on a press of the top cover by the at least one of the middle finger or the index finger; and the pressure sensor coupled to the digital switch and configured to provide, to the one or more processors, force data indicative of an amount of force of the press of the top cover by the at least one of the middle finger or the index finger.

2. The system as recited in claim 1, further comprising logic configured to detect a presence of the at least one of the middle finger or the index finger based at least in part on the touch data provided by the touch sensor.

3. The system as recited in claim 1, wherein the touch data is indicative of a location of the at least one of the middle finger or the index finger on the top cover as the location changes over time, and further comprising logic configured to detect a gesture of the at least one of the middle finger or the index finger based at least in part on the touch data provided by the touch sensor.

4. The system as recited in claim 1, wherein the touch sensor comprises a first region and a second region, and further comprising logic configured to detect a presence of the at least one of the middle finger or the index finger and to determine that the at least one of the middle finger or the index finger is located in the first region of the touch sensor based at least in part on the touch data provided by the touch sensor.

5. The system as recited in claim 1, wherein the top-surface control comprises a first top-surface control controllable by at least one of a first middle finger or a first index finger of the user, the top cover comprises a first top cover, the touch sensor comprises a first touch sensor configured to provide first touch data indicative of a first touch input, the digital switch comprises a first switch configured to provide first selection data, and the pressure sensor comprises a first pressure sensor configured to provide first force data, and the handheld controller further comprising:

a second top-surface control residing on the top surface of the housing and controllable by at least one of a second middle finger or a second index finger of the user, the second top-surface control comprising:

a second top cover;

a second touch sensor adjacent to the second top cover and configured to provide, to the one or more processors, second touch data indicative of a second touch input based at least in part on contact between the at least one of the second middle finger or the second index finger and the second top cover;

a second switch residing at least partly beneath the second top cover and configured to provide, to the one or more processors, second selection data indicative of a selection of the second top-surface control based at least on a press of the second top cover by the at least one of the second middle finger or the second index finger; and a second pressure sensor coupled to the second switch and configured to provide, to the one or more processors, second force data indicative of an amount of force of the press of the second top cover by the at least one of the second middle finger or the second index finger.

6. A system comprising:
one or more processors;
a handheld controller comprising:
a housing having a top surface; and
a top-surface control residing on the top surface of the housing and controllable by at least one finger of a user operating the handheld controller, the top-surface control comprising:
a top cover;
a touch sensor adjacent to the top cover and configured to provide, to the one or more processors, touch data indicative of a touch input based at least in part on contact between the at least one finger and the top cover; and
a digital switch residing at least partly beneath the top cover, mounted on a pressure sensor of the top-surface control, and configured to provide, to the one or more processors, selection data indicative of a selection of the top-surface control based at least on a press of the top cover by the at least one finger; and
logic configured to detect a gesture of the at least one finger based at least in part on the touch data provided by the touch sensor and on the selection data provided by the digital switch.

7. The system as recited in claim 6, wherein the touch sensor comprises a capacitive touch sensor, a resistive touch sensor, or an infrared touch sensor.

8. The system as recited in claim 6, wherein the logic is further configured to detect a presence of the at least one finger based at least in part on the touch data provided by the touch sensor.

9. The system as recited in claim 6, wherein the touch data is indicative of a location of the at least one finger on the top cover as the location changes over time.

10. The system as recited in claim 6, wherein the touch sensor comprises a first region and a second region, and wherein the logic is further configured to detect a presence of the at least one finger and to determine that the at least one finger is located in the first region of the touch sensor based at least in part on the touch data provided by the touch sensor.

11. The system as recited in claim 6, wherein the pressure sensor is configured to provide, to the one or more processors, force data indicative of an amount of force of the press of the top cover by the at least one finger.

12. The system as recited in claim 6, wherein the housing further comprises a front surface, the handheld controller further comprising a front-surface control residing on the front surface of the housing and controllable by a thumb of the user.

13. The system as recited in claim 6, wherein the top-surface control comprises a left top-surface control controllable by at least one finger of a left hand of the user, the top cover comprises a left top cover, the touch sensor comprises a left touch sensor configured to provide first touch data indicative of a first touch input, and the digital switch comprises a left switch configured to provide first selection data, and the handheld controller further comprising:

a right top-surface control residing on the top surface of the housing and controllable by at least one finger of a right hand of the user, the right top-surface control comprising:
a right top cover;
a right touch sensor adjacent to the right top cover and configured to provide, to the one or more processors, second touch data indicative of a second touch input based at least in part on contact between the at least one finger of the right hand and the right top cover; and a right switch residing at least partly beneath the right top cover and configured to provide, to the one or more processors, second selection data indicative of a selection of the right top-surface control based at least on a press of the right top cover by the at least one finger of the right hand.

14. One or more non-transitory computer-readable media storing computer-executable instructions that, when executed on one or more processors, cause the one or more processors to perform acts comprising:

receiving touch data from a touch sensor of a handheld controller, the touch sensor residing adjacent to a top-surface control of the handheld controller, the top-surface control being operable by at least one finger of a user of the handheld controller;

receiving selection data from a digital switch of the handheld controller based at least in part upon a press of the top-surface control by the at least one finger, the digital switch residing adjacent the touch sensor and mounted on a pressure sensor of the handheld controller; and detecting a gesture of the at least one finger based at least in part on the touch data received from the touch sensor and on the selection data received from the digital switch.

15. The one or more non-transitory computer-readable media as recited in claim 14, the acts further comprising:

determining that the top-surface control has been selected based at least in part on the selection data.

16. The one or more non-transitory computer-readable media as recited in claim 14, the acts further comprising receiving force data from the pressure sensor of the handheld controller based at least in part upon the press of the top-surface control by the at least one finger, the pressure sensor residing adjacent the touch sensor.

17. A method for assembling at least a portion of a handheld controller, the method comprising:

coupling a digital switch to a top surface of a housing of the handheld controller, the digital switch configured to generate selection input at least partly in response to a press of the digital switch;

coupling a touch sensor to a top cover and to one or more processors of the handheld controller, the touch sensor configured to generate touch data and provide the touch data to the one or more processors;

mounting a pressure sensor to the digital switch and coupling the pressure sensor to the one or more processors, the pressure sensor configured to generate force data indicative of a force of the press of the digital switch; and coupling the top cover to the top surface of the housing to at least partly cover the digital switch such that selection of the top cover by a finger of a user of the handheld controller causes the press of the digital switch.

18. The method as recited in claim 17, further comprising coupling a front-surface control to a front surface of the housing, the front-surface control operable by a thumb of the user.

19. A system comprising:
one or more processors; and
a handheld controller comprising:
a housing having a top surface; and
a top-surface control residing on the top surface of the housing and controllable by at least one finger of a user operating the handheld controller, the top-surface control comprising:
a top cover;
a touch sensor adjacent to the top cover and configured to provide, to the one or more processors, touch data indicative of a touch input based at least in part on contact between the at least one finger and the top cover;
a pressure sensor configured to provide, to the one or more processors, force data indicative of an amount of force of a press of the top cover by the at least one finger; and
a digital switch mounted on the pressure sensor and configured to provide, to the one or more processors, selection data indicative of a selection of the top-surface control based at least on the press of the top cover by the at least one finger.

20. The system as recited in claim 19, wherein the digital switch resides at least partly beneath the top cover.

21. The system as recited in claim 19, wherein the touch sensor comprises a capacitive touch sensor, a resistive touch sensor, or an infrared touch sensor.

22. The system as recited in claim 19, further comprising logic configured to detect a presence of the at least one finger based at least in part on the touch data provided by the touch sensor.

23. The system as recited in claim 19, wherein the touch data is indicative of a location of the at least one finger on the top cover as the location changes over time, and further comprising logic configured to detect a gesture of the at least one finger based at least in part on the touch data provided by the touch sensor.

24. The system as recited in claim 19, wherein the touch sensor comprises a first region and a second region, and further comprising logic configured to detect a presence of the at least one finger and to determine that the at least one finger is located in the first region of the touch sensor based at least in part on the touch data provided by the touch sensor.

25. The system as recited in claim 19, wherein the housing further comprises a front surface, the handheld controller further comprising a front-surface control residing on the front surface of the housing and controllable by a thumb of the user.

26. The system as recited in claim 19, wherein the top-surface control comprises a left top-surface control controllable by at least one finger of a left hand of the user, the top cover comprises a left top cover, the touch sensor comprises a left touch sensor configured to provide first touch data indicative of a first touch input, and the pressure sensor comprises a left pressure sensor configured to provide first force data, and the handheld controller further comprising:

a right top-surface control residing on the top surface of the housing and controllable by at least one finger of a right hand of the user, the right top-surface control comprising:
a right top cover;
a right touch sensor adjacent to the right top cover and configured to provide, to the one or more processors, second touch data indicative of a second touch input based at least in part on contact between the at least one finger of the right hand and the right top cover; and a right pressure sensor configured to provide, to the one or more processors, second force data indicative of an amount of force of a press of the right top cover by the at least one finger of the right hand.

27. The system as recited in claim 19, wherein:

the touch sensor is attached to a back surface of the top cover and is connected, via a connector, to a printed circuit board (PCB) within the housing of the handheld controller;

the digital switch is positioned underneath the touch sensor; and the digital switch and the pressure sensor are connected to the PCB.

* * * * *